(12) United States Patent
Mamié

(10) Patent No.: US 8,464,402 B2
(45) Date of Patent: Jun. 18, 2013

(54) CLAMPING LOCK FOR A TENSIONING MEANS

(75) Inventor: André Mamié, Freienbach (CH)

(73) Assignee: Spanset Inter AG, Wollerau (CH)

( * ) Notice: Subject to any disclaimer, the term of this patent is extended or adjusted under 35 U.S.C. 154(b) by 393 days.

(21) Appl. No.: 12/679,348

(22) PCT Filed: Sep. 22, 2008

(86) PCT No.: PCT/EP2008/062615
§ 371 (c)(1),
(2), (4) Date: Mar. 22, 2010

(87) PCT Pub. No.: WO2009/040326
PCT Pub. Date: Apr. 2, 2009

(65) Prior Publication Data
US 2010/0218348 A1 Sep. 2, 2010

(30) Foreign Application Priority Data
Sep. 20, 2007 (DE) .......................... 10 2007 045 170

(51) Int. Cl.
*A44B 11/06* (2006.01)
(52) U.S. Cl.
USPC .................................. 24/170; 24/191; 24/193
(58) Field of Classification Search
USPC .................. 24/170, 168, 193, 489, 494, 68 E, 24/69 ST, 191
See application file for complete search history.

(56) References Cited

U.S. PATENT DOCUMENTS

| 2,816,339 | A | * | 12/1957 | Prete, Jr. et al. | 24/170 |
| 3,011,237 | A | * | 12/1961 | Prete, Jr. | 24/170 |
| 3,252,191 | A | * | 5/1966 | Mezerenyi et al. | 24/318 |
| 3,253,309 | A | * | 5/1966 | Baresch | 24/170 |
| 3,608,158 | A | * | 9/1971 | Bengtsson | 4/170 |
| 4,021,072 | A | * | 5/1977 | Belanger | 296/71 |
| 4,373,234 | A | | 2/1983 | Boden | |
| 4,408,373 | A | * | 10/1983 | Miskowicz | 24/664 |
| 4,843,688 | A | * | 7/1989 | Ikeda | 24/170 |
| 5,371,926 | A | * | 12/1994 | Van Noy et al. | 24/171 |
| 5,392,535 | A | * | 2/1995 | Van Noy et al. | 36/88 |
| 5,839,175 | A | * | 11/1998 | Lin | 24/636 |
| 6,868,587 | B2 | * | 3/2005 | Rard | 24/170 |

(Continued)

FOREIGN PATENT DOCUMENTS
EP 0439053 A1 7/1991
EP 0841020 A1 5/1998

(Continued)

*Primary Examiner* — Robert J Sandy
*Assistant Examiner* — Rowland D Do
(74) *Attorney, Agent, or Firm* — The Webb Law Firm

(57) ABSTRACT

A clamping lock for a tensioning means with a housing comprising two cheek parts arranged at a distance from each other, a stop web extending between the cheek parts and a pivot spindle likewise extending between the cheek parts and a comb element pivotably mounted on the pivot spindle of the housing. The clamping lock can be manufactured in a simple manner and at the same time has a compact, easily manageable design because there is a reinforcing insert at least in the region of the cheek parts of the stop web and of the pivot spindle of the housing, said reinforcing insert being surrounded by a plastics material casing and comprises a material which is firmer than the plastics material casing.

17 Claims, 9 Drawing Sheets

U.S. PATENT DOCUMENTS

| | | | |
|---|---|---|---|
| 6,877,189 B2 * | 4/2005 | Simonson et al. | 24/170 |
| 7,954,207 B2 * | 6/2011 | Fatemi | 24/298 |
| 2004/0163216 A1 | 8/2004 | Simonson et al. | |
| 2005/0146197 A1 * | 7/2005 | Enomoto et al. | 297/482 |
| 2007/0283539 A1 * | 12/2007 | Pezza | 24/640 |

FOREIGN PATENT DOCUMENTS

| | | |
|---|---|---|
| GB | 678069 A | 8/1952 |
| WO | 8702552 A1 | 5/1987 |
| WO | 0030487 A2 | 6/2000 |

* cited by examiner

CLAMPING LOCK FOR A TENSIONING MEANS

BACKGROUND OF THE INVENTION

1. Field of the Invention

The invention relates to a clamping lock for a tensioning means, which comprises a housing and a comb element mounted in the housing. The housing comprises in this case two cheek parts arranged at a distance from each other, a stop web which extends between the cheek parts and a pivot spindle which likewise extends between the cheek parts. The comb element is pivotably mounted on the pivot spindle of the housing. Clamping locks of this type are used to adapt the length of the respective tensioning means to the respective fastening task while maintaining the respectively required tensioning forces.

2. Description of Related Art

Clamping locks of the type in question are typically used in combination with tensioning means which are in the form of belts, bands or ropes, are sufficiently pliable and are at the same time able to transmit the tensioning forces required in each case.

Known clamping locks, such as are described in WO 00/30487 for example, generally have a housing and a comb element which is mounted in the housing in an eccentrically pivotably movable manner. At the same time, the known clamping locks generally have a stop element which is arranged in such a way as to form a clamping slot between a stop surface of the stop element, which stop surface is arched outward in the direction of the comb element, and the outwardly arched circumferential surface of the comb element, the clear width of the clamping slot being determined by the pivoting position of the comb element. The arrangement of the pivot spindle of the comb element and the stop surface of the stop element are in this case selected in such a way as to restrict the clamping slot in the event of the comb element being pivoted counter to the direction of insertion of the tensioning element. In this way, when the clamping slot is opened wide, it is possible to insert the tensioning element into the clamping slot in a substantially force-free manner. As soon as the required tension is subsequently reached in the tensioning means, the tensioning means exerts a high normal force on the circumferential surface of the comb element. After the free end guided by the clamping lock has been relieved of the tensioning force, the tensioning element entrains the comb element, as a consequence of this force and the friction acting between the comb element and tensioning means, counter to the direction of insertion, so that the width of the clamping slot is minimised and the tensioning means is clamped-in between the circumferential surface of the comb element and the stop surface of the stop element. On account of the reaction forces prevailing in the tensioning means in the tensioned state, this clamping is maintained until the comb element is pivoted in the direction of insertion by an externally acting force and the width of the clamping slot is in this way widened again.

The known clamping locks have the problem that, on the one hand, the clamping force prevailing in the clamping slot is dependent on the friction prevailing between the comb element and the tensioning means. On the other hand, in many cases it proves difficult in the known clamping locks, in practice in particular in tensioning fastenings requiring high tensioning forces, to release the comb element from its clamping position in order to set the tensioning means free again.

In the case of a variant of a clamping lock that is likewise disclosed in WO00/30487, attempts have been made to eliminate these problems by forming a rim, around which a tensioning element is guided, at the trailing end, in the direction of insertion of the tensioning means, of the first outwardly arched circumferential surface portion of the comb element that is associated with the stop surface of the stop element. The circumferential surface portion adjoining the rim in the direction of insertion is in this case embodied in a flattened manner, so that the tensioning element is guided in a kinked course around the rim. At its end opposing the rim, the flattened circumferential surface portion merges with a second outwardly arched circumferential surface portion which opposes the first outwardly arched circumferential surface portion of the comb element.

A stop surface, which is formed on a further correspondingly embodied housing web of the known clamping lock, is associated with this second circumferential surface portion too. In this way, a double clamping of the tensioning means in the tensioning position is achieved, the clamping forces being especially high on account of the deflection of the tensioning means about the rim between the first outwardly arched circumferential portion and the flattened circumferential portion. Nevertheless, this has the drawback that inserting the tensioning means into the clamping lock is so awkward as to be hardly manageable under the rough conditions prevailing in the practice of a carrier, for example.

The latter aspect also applies in particular because, in the known clamping lock, a lever, via which the comb element can be pivoted from a clamping to a release position, can additionally be moulded onto the comb element. This lever extends over the width of the comb element so that it can be used to transmit sufficiently high forces. In order nevertheless to be able to guide the tensioning means through the clamping lock, an opening, through which the tensioning element must additionally be guided on its path through the clamping lock, is formed in the lever.

Furthermore, in order to increase the safety with which the tensioning means draws the comb element into the clamping gap, it is known to mould latching projections onto the circumferential surface of the comb element that enters into contact with the tensioning means. The latching projections reach into the tensioning means, which in the tensioned state rests tight against the clamping element, thus producing not only a frictionally engaged, but also a form-fitting connection between the tensioning means and comb element (US 2004/0163216 A1).

In addition to the awkward handling, a further drawback of the known clamping locks consists in the fact that they are, on account of the large number of components required for assembly thereof, technically complex and accordingly expensive to manufacture.

A clamping lock which can be produced more economically as a result of a reduction in the number of components required for manufacture thereof is known from EP 0 841 020 A1. This known clamping lock has a housing which is produced in one piece from plastics material and in which a separately pre-produced comb element, which is also made of plastics material, is pivotably mounted. The housing has two elongate cheeks arranged parallel and at a distance from each other. In the region of its one end, a stop web, around which the band, which is to be adjusted in each case with respect to its effective length, is loosely guided, extends between the cheeks, whereas a likewise web-like fastening portion extends in the region of its other end between the cheeks. The stop web is in this case traversed by a through-opening which is oriented coaxially with its longitudinal axis and with the inlet openings of which a lug of a bracket which is pivotably mounted on the stop web engages.

For pivotably mounting the comb element, in the clamping lock known from EP 0 841 020 A1, the plastics material housing contains a separately pre-produced spindle which is fed through two openings in the cheeks, which openings are arranged opposing each other and oriented coaxially with each other and axis-parallel to the longitudinal axis of the stop web. At the same time, the spindle is guided through a corresponding through-opening on an end portion of the comb element.

A drawback of the embodiment of a clamping lock as known from EP 0 841 020 A1 is the fact that the pivot spindle required for the comb element has to be inserted into the housing as a separate component. This not only requires a relatively small diameter of the spindle, but also necessitates the use of a material for the spindle which is able to withstand the forces occurring during practical use. In addition, the simultaneous insertion of the spindle through the openings associated therewith in the housing and the opening in the comb element requires an additional operation which has to be carried out at high precision.

Finally, GB 678,069 discloses a clamping lock which likewise comprises a housing produced in one piece from a material (not defined in greater detail) and a comb element which is pivotably mounted in the housing. The housing likewise has two lateral cheeks between the one ends of which a fastening portion extends for fastening the one end of the band which is in each case to be adjusted with respect to its effective length, whereas a stop web, via which the band is guided and against which a comb element which is pivotably mounted in the housing acts, is embodied between the other ends of the cheeks. The comb element is in this case pivotably mounted on two short lugs which protrude inward into the space bounded by the housing and reach into corresponding openings in the comb element. In the stress-relieved, non-deformed state, the width of the comb element corresponds, apart from a slight undersize, to the clear width between the cheeks of the housing.

The prerequisite for the assemblability and operativeness of the clamping lock known from GB 678,069 is accordingly that the comb element be flexible transversely to its pivot spindle to the extent that its openings can be brought into engagement with the lugs of the housing that are associated therewith in each case by an appropriate elastic deformation of the comb element or housing. Likewise, sufficient pliability of the comb element should also allow the known clamping lock to be used on bands of differing thickness. This deformability, which is thus necessarily present, harbours the risk that sufficient clamping of the band will no longer be ensured at high loads.

Against the background of the prior art described hereinbefore, the object of the invention consisted in providing a clamping lock which has high functional reliability and also a compact, easily manageable design and can at the same time be manufactured in a simple manner.

SUMMARY OF THE INVENTION

According to the invention, this object is achieved by a clamping lock having the features specified in claim 1. The claims dependent on claim 1 specify advantageous embodiments of a clamping lock according to the invention of this type.

The invention starts from the finding that sufficiently high stability requires the housing to be reinforced in the region of the pivot spindle for the clamping element, of the stop and/or of a fastening portion which may be additionally present by a reinforcing element which is made of a firmer material and is inserted into a plastics material casing.

According to the invention, this is achieved in that, in the housing of a clamping lock according to the invention, there is a reinforcing insert at least in the region of the cheek parts, of the stop web and of the pivot spindle of the housing, said reinforcing insert being surrounded by a plastics material casing and being made of a material which is firmer than the material of the plastics material casing.

In addition, the housing can have a fastening portion. This fastening portion can be used for generally fastening the clamping lock or for connecting the end of a tensioning means. The latter is beneficial when, for example, two tensioning means are connected to each other via the clamping lock or the tensioning means forms a loop, the ends of which are joined together by the clamping lock. In order to allow a connection which is as simple as possible, it is beneficial, specifically when two ends of tensioning means are connected to the clamping lock, if the fastening portion is embodied in a web-like manner and so as to extend parallel to the stop web.

The reinforcing insert present in the housing of a clamping lock according to the invention can for example be embodied in the manner of a frame with a plurality of web-like portions. In this case, the reinforcing insert can have in each case portions which reinforce not only the pivot spindle of the comb element, but also the stop web and also the fastening portion which may be present. A reinforcing element of this type can for example be formed by a metal punched part or made of another comparatively inexpensive and simply processable solid material. Likewise, it is conceivable to combine a plurality of punched parts, each of which is frame-like, to form the reinforcing part if this is more advantageous from the point of view of production.

A clamping lock according to the invention may be manufactured in a particularly economical manner in that the stop web and the pivot spindle of the comb element are moulded onto its housing in one piece. This embodiment allows the housing to be fully pre-produced as a separate, self-enclosed and as such one-piece component, at least the stop web and the pivot spindle of the comb element then already being finished on the component obtained. If there is a fastening portion, this can also be integrally connected to the housing.

The comb element can be fastened on the pivot spindle of the housing configured in accordance with the invention in a simple manner in that a bearing opening, which has, viewed in cross section, an inner circumferential surface which encompasses an angle of more than 180° and is arched inward in the shape of an arc of a circle, is formed in the comb element.

If the housing of the clamping lock according to the invention is embodied in one piece, then simple mounting of the comb element on its pivot spindle may in this case be allowed in that the bearing opening in the comb element is formed as a slotted opening and its radius of curvature is adapted to the diameter of the pivot spindle in such a way that the comb element is positioned on the pivot spindle in a pivotably movable manner under the action of a clamping force. The pressing between the outer surfaces of the pivot spindle and the inner surfaces of the recess can in this case be designed without difficulty in such a way that the comb element is positioned on the pivot spindle without play under the action of the clamping force.

Another embodiment of the invention that functions reliably even under disadvantageous conditions of use, but is at the same time also simple to produce is characterised in that the housing is composed of two housing parts and in that the parting plane of the housing intersects the longitudinal axis of stop web and pivot spindle, in each case at an angle which is greater than 0°. The division of the housing into two parts allows use to be made of a comb element in which the bearing opening is completely surrounded in the radial direction by material of the comb element. During assembly of the housing, the pivot spindle of the housing is fed into the bearing opening in the comb element.

If the parting plane in the region of the pivot spindle directly abuts the one cheek part of the housing, then the pivot spindle protrudes in a lug-like manner from the other cheek part in the pre-produced, not yet joined-together state of the housing. However, equally, the parting plane can also intersect the pivot spindle at any other point present between the cheek parts. In this case, in the pre-produced, not yet joined-together state of the housing, a respective portion of the pivot spindle protrudes in a lug-like manner from the cheek part which is associated with the respective housing part. A particularly simple embodiment of the housing parts with at the same time optimum functioning is obtained when the parting plane of the housing runs in the centre between the cheek parts. Preferably, the parting plane is oriented normally to the longitudinal axis of the pivot spindle, of the stop web and of the fastening portion in order to allow simple joining of the housing parts.

In the case of the two-part housing, the connection between the housing parts should be non-detachable after joining-together in order to prevent the clamping lock from falling apart in an undesirable manner. For this purpose, the housing parts can be connected to each other in a material-uniting and also form-fitting and/or force-transmitting manner, for example by adhesive bonding or welding.

The housing of a clamping lock according to the invention may be manufactured in a simple manner in terms of production in that the plastics material casing is sprayed onto the reinforcing insert.

The performance characteristics of a clamping lock according to the invention can be further improved in that a receptacle, containing a spring which resiliently elastically supports the comb element against at least one of the cheek parts in such a way that the spring automatically pivots the comb element in the direction of the stop web, is formed in the comb element. This ensures that the comb element automatically moves, under the resiliently elastic force of the spring positioned therein, in each case into the correct position for operation thereof.

In order to further increase the utility of a clamping lock according to the invention for a tensioning means, the stop web can have, in a clamping lock of this type, a shaped, in particular arched, stop surface, the clamping element, which is mounted so as to be pivotable about the pivot spindle, can have a circumferential surface portion associated with the stop surface of the stop web, and a clamping slot delimited at opposing sides by the stop surface of the stop web and the circumferential surface portion of the comb element can be present for feeding through the tensioning means. According to the invention, the circumferential surface portion of the comb element that is associated with the stop surface of the stop web is then shaped in the opposite manner to the stop surface of the stop web.

As in the prior art, the function of the clamping lock according to the invention configured in this way is based on the fact that the clamping element is drawn into the clamping gap on account of the tensile forces acting in the tensioning means, the clamping gap is therefore narrowed in association with the movement of the comb element, and an accordingly high clamping force is exerted on the surfaces of the tensioning means that rest against the comb element and the stop web.

However, in this case, in a clamping lock according to the invention, the surface portions delimiting the clamping slot are to be embodied in such a way that the tensioning means, which is guided through the clamping slot, rests, in the tensioned state, in a planar manner both against the circumferential surface of the comb element and against the stop surface of the stop web. Unlike in the known clamping locks, in which the clamping of the respective tensioning means is in all cases limited to an approximately linear region which is delimited as narrowly as possible, in a clamping lock according to the invention the tensioning means is thus pressed, in the tensioned state, between two larger surface portions in a targeted manner.

This provides a larger pressure area between the tensioning means and stop web or comb element, so that the clamping forces act on the comb element not only in a locally narrowly delimited region. Instead, in a clamping lock according to the invention, the comb element is loaded over a larger area, thus preventing load peaks inducing fractures or cracks which occur in a locally narrowly delimited manner. Should the clamping lock according to the invention be stressed beyond the maximum degree to which it is permitted to be loaded, not even this leads to fracture in the embodiment according to the invention of a clamping lock. This is achieved in that the tensioning means does not draw the comb element deeper and deeper into the clamping slot as the tensioning force increases, but that the comb element is supported against the clamping slot over such a large area that it is no longer possible for the clamping forces to increase once a specific clamping position has been reached. In a clamping lock according to the invention, the tensioning means therefore begins to slide through the clamping slot when a specific maximum admissible loading of the comb element and stop web is exceeded. This process is a clear indication to the user. This indication protects the user from loading the clamping lock so intensively that it breaks suddenly and in a non-anticipated manner with consequences which may be disastrous.

Surprisingly, it has been found that, in the configuration according to the invention of the clamping lock, not only is the security with which the tensioning means is held in the tensioned state in the clamping slot improved over the known clamping locks, but a clamping lock according to the invention may also be handled in a particularly simple manner. Thus, in a clamping lock according to the invention, there is no need to awkwardly insert the tensioning means in order to bring about the required retaining forces. The fact that the shaping according to the invention of the comb element and stop web reduces the risk of accidental clamping of the pivotably movable comb element likewise to a minimum ensures at all times that the clamping lock according to the invention can be opened in a simple manner.

In principle, the effect which is utilised in accordance with the invention of the mutually associated surfaces of the stop web and comb element, which surfaces are shaped so as to correspond to each other, may be utilised even when the stop surface of the stop web is arched inward and the circumferential surface associated therewith of the comb element is arched outward. However, this embodiment may presuppose that the tensioning means is guided in a manner which may, under specific conditions, in practice prove impractical.

This problem does not exist when the stop surface of the stop web is arched outward and the circumferential surface associated therewith of the comb element is arched inward. In this embodiment of a clamping lock according to the invention, it is readily possible without additional design complexity to guide the tensioning means in such a way that the line of action of the tensile forces absorbed by the clamping lock is oriented in accordance with the course of the tensioning means which is brought up to the clamping lock.

A further particularly advantageously variant of a clamping lock according to the invention is characterised in that a support portion, which supports the comb element, when it is pivoted against the stop web, against the stop web, is moulded onto the comb element. This support portion can on the one hand be utilised to deflect the tensioning means, which is guided through the clamping slot, in such a way as to ensure an optimum course for clamping thereof. On the other hand, it allows the clamping force prevailing in the clamping slot to be adjusted in such a way that the material of the tensioning means is not damaged by the clamping, while at the same time ensuring a hold which reliably meets the respective requirements. The effect of the support portion can in this case additionally be improved in that the support portion has a support surface with which it acts against the stop web when the comb element is in a position pivoted against the stop web. In this case, it has been found to be particularly advantageous with regard to the possible embodiments if the support portion is embodied as a projection. That is to say, in this case, the support surface of the support portion can be embodied between its free end face and the circumferential surface of the comb element that is associated with the stop surface of the stop web.

Material loading of the tensioning means that is as low as possible, with at the same time particularly simple handling and reliable functioning of a clamping lock according to the invention, is obtained if, when the clamping element is pivoted against the stop web and viewed in the direction of insertion of the tensioning means, the clear width of the clamping slot widens, starting from the inlet opening therein, in the direction of the outlet opening.

In principle, it is sufficient for the functioning of a clamping lock according to the invention if the composition of the "circumferential surface portion of the comb element"/"tensioning means" material pairing is such that the comb element is moved, on account of the forces exerted by the tensioning means in the tensioned state, in the direction of the clamping slot. This may be achieved in a particularly reliable manner if at least one latching projection, which in practical use is intended to interlock in the manner of a barb with the tensioning means which is guided through the clamping slot, is embodied on the circumferential surface portion of the comb element. In addition, the security of the coupling, which is in this case at least form-fitting, of the comb element and tensioning means can be increased in that the latching projection of the circumferential surface portion of the comb element extends over the width of the clamping slot. If necessary, it is in this case possible for more than one latching projection to be embodied on the circumferential surface portion of the comb element in order to further increase the security of the coupling of the tensioning means and comb element. In view of the respective shaping of the stop surface or the circumferential surface entering into contact with the tensioning means, it may in this case be expedient if the spacing of the latching projections decreases, viewed in the direction of insertion, starting from the inlet opening in the direction of the outlet opening of the clamping slot. This applies in particular when the arching of the circumferential course does not have a regular course.

As described in the above-described manner for the circumferential surface portion of the comb element, at least one latching projection can also be embodied on the stop surface of the stop web that is associated with the circumferential surface portion in order to additionally increase the security with which the tensioning means is held in the tensioned state in the clamping slot. For this purpose, it may be advantageous if the at least one latching projection of the stop surface of the stop web is directed counter to the at least one latching projection of the circumferential surface portion of the comb element.

In order to prevent excessively wide pivoting of the comb element on the pivot spindle of the housing of a clamping lock according to the invention, a stop, which limits the pivoting path of the comb element on the pivot spindle, can be embodied on the pivot spindle.

The releasing of the comb element from its clamping position can be simplified in a simple manner in that a clamping lock according to the invention has a lever element which is mounted in an independently pivotably movable manner and pivots the comb element, on exertion of an actuating force directed onto the lever element, from the clamping position, in which it acts against the stop web, into a release position pivoted away from the stop web. A lever element of this type can in this case be without difficulty arranged pivotably and so as to be coupled to the comb element in the housing of a clamping lock configured in accordance with the invention, in such a way that it utilises the lever rules in order to assist the releasing force which is, for example, applied manually. For this purpose, a bearing for pivotably movably mounting the lever element can be embodied on the housing. This bearing can for example be embodied in the form of a moulded element which is associated with the lever element and connected to the housing body securely and integrally, in a manner comparable to the pivot spindle of the comb element, or in the form of two receptacles which are arranged opposing each other for lugs protruding laterally from the lever element.

The invention thus provides a secure and easily manageable and also inexpensively producible possibility for joining together two ends of a tensioning means forming a loop or two separate tensioning means. Each tensioning means may be tightened without difficulty by manual force when using a clamping lock according to the invention, as the forces to be overcome within the clamping lock during the tensioning process are reduced to a minimum. Equally, the clamping lock device according to the invention may be rereleased by simple manual actuation.

In a clamping lock according to the invention, the tension applied is automatically and immediately maintained after the tensioning by a retaining mechanism formed by the comb element and stop web. The retaining mechanism of a clamping lock according to the invention can in this case secure a multiple of the tension to which each tensioning means is subjected.

Thus, the clamping lock according to the invention may readily be designed in such a way as to have a strength and rigidity reliably withstanding the forces acting on it in each case. It is also possible to readily ensure for a clamping lock according to the invention, without particular design complexity, that its breaking strength is at least twice as high as the maximum actual load acting on the clamping lock.

The drawbacks existing in the prior art, such as the need to overcome a certain pre-tensioning of each comb element in order even to be able to guide the tensioning means through the clamping slot, the risk of damage to the tensioning means as a result of excessive friction in the region of the clamping slot, fatigue of the spring elements required for pre-tensioning the comb element, awkward handling, fracture of the bolt, which forms the pivot spindle of the comb element and is generally mounted separately, as a consequence of the high loads, are eliminated in a clamping lock according to the invention. In this regard, a clamping lock according to the invention is suitable for economical large-scale production, in particular as a result of the possibility of fully pre-producing the housing as a separate component with the stop web, the pivot spindle for the tensioning element and, if necessary, with the fastening portion.

In particular, not only does the combination, which is provided as an advantageous embodiment of the invention, of a solid core insert and a plastics material casing sheathing the core insert allow maximum possible freedom of design with regard to ergonomics and performance characteristics of the clamping lock according to the invention; rather, this combination of materials also allows the optionally provided reinforcing insert of the housing to be made of an inexpensive, if appropriate rust-sensitive sheet metal material and said material to be embedded into the plastics material casing in such a way that the core is reliably protected from corrosion over the entire service life of the clamping lock.

The assembly of a clamping lock according to the invention is extremely simple. Thus, the individual parts, which are pivotably movable in the fully assembled state, and their bearing points provided in the housing of the clamping lock may be embodied without difficulty in such a way that they can be coupled to one another during assembly in the manner of snap or clamping connections without additional complex tools.

BRIEF DESCRIPTION OF THE DRAWINGS

The invention will be described hereinafter in greater detail with reference to drawings which illustrate exemplary embodiments and in which:

FIG. 5b is a schematic perspective exploded illustration of the clamping lock according to FIG. 5a;

FIG. 6 is a schematic longitudinal section of the clamping lock according to FIG. 5a;

DETAILED DESCRIPTION OF THE PREFERRED EMBODIMENTS

Figure 1:
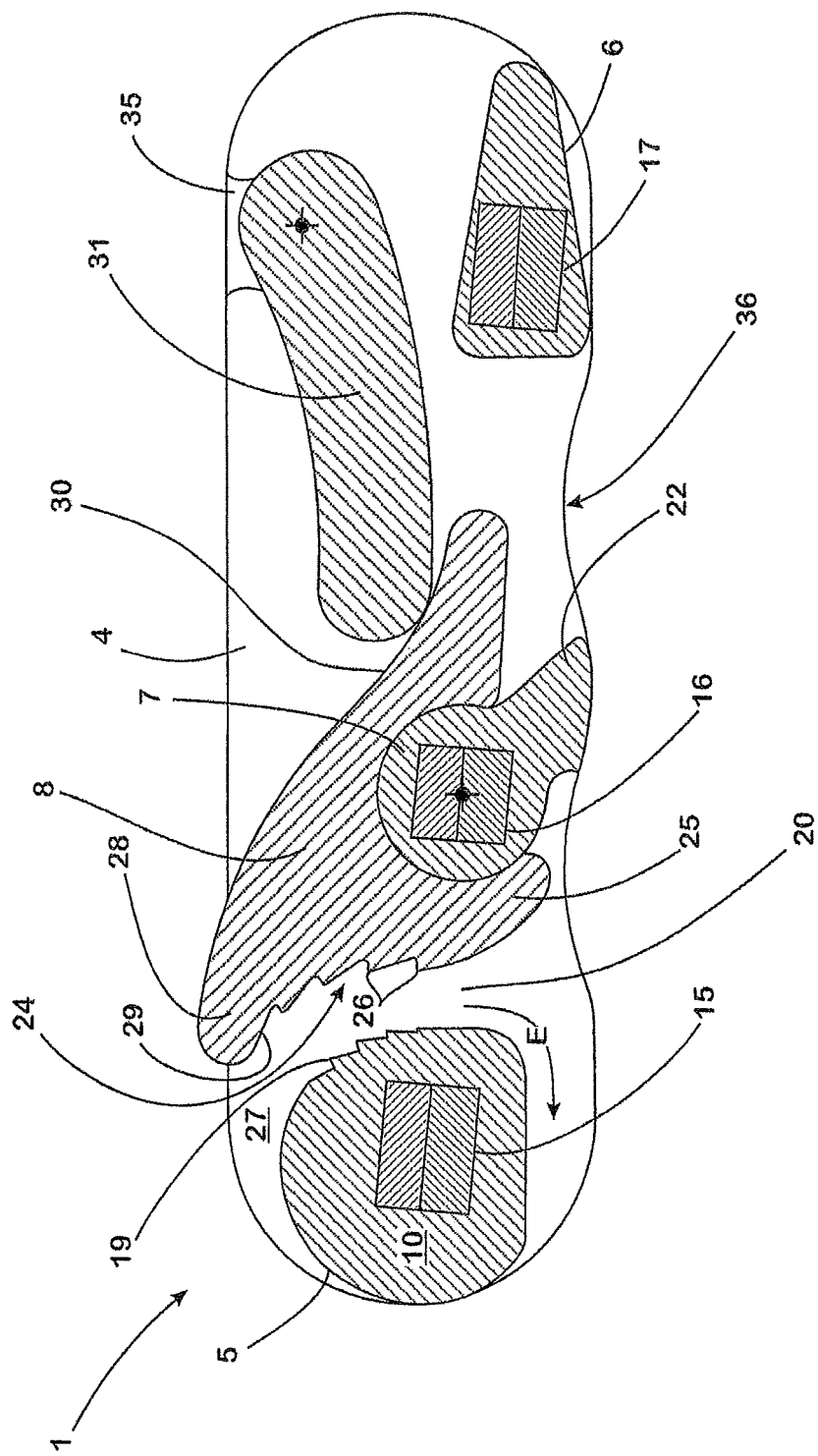
FIG. 1 is a schematic longitudinal section of a first variant of a clamping lock in the opened position.

The clamping lock 1 comprises a housing 2 which is pre-produced as a unitary body. The housing 2 is in this case formed by two cheek parts 3, 4 which are positioned opposing each other, a stop web 5 extending at their one end between the cheek parts 3, 4, a web-like fastening portion 6 extending at their other end between the cheek parts 3, 4 and a pivot spindle 7, which is arranged between the stop web 5 and the fastening portion 6 and likewise extends between the cheek parts 3, 4, for a comb element 8. All of the moulded parts (cheek parts 3, 4, stop web 5, fastening portion 6, pivot spindle 7) of the housing 2 jointly form a body which is interconnected integrally, securely and non-detachably.

In this case, the housing 2 is reinforced by a reinforcing insert 9 which is cast into a plastics material casing 10 determining the outer shape of all the moulded elements of the housing 2. The reinforcing insert 9 is configured in the manner of a frame and is composed of two identical punched parts 11, 12 which are positioned in a planar manner one on the other and are pre-produced from an inexpensive, rust-sensitive, but sufficiently strong steel. The reinforcing insert has two longitudinal webs 13, 14 each associated with one of the cheek parts 3, 4, a first web-like portion 15 which extends between the mutually associated ends of the longitudinal webs 13, 14 and reinforces the stop web 5, a second web-like portion 16 which extends between the other ends of the longitudinal webs 13, 14 and reinforces the fastening portion 6, and a portion 17 which is arranged between the first portion 15 and the second portion 16 of the reinforcing insert 9, likewise extends between the longitudinal webs 13, 14 and reinforces the pivot spindle 7.

The stop web 5 has, on its side associated with the pivot spindle 7, a stop surface 18 which extends over the entire width B of the stop web 5 and is arched, viewed in cross section (FIGS. 1, 2), convexly outward. Latching projections 19, which are arranged distributed at regular distances over the circumference of the stop surface 18, are formed in the stop surface 18. The freely protruding rims of the latching projections 19 are in this case oriented in the direction of insertion E in which a tensioning means S, which is to be braced in the clamping lock 1, is inserted into the clamping slot 20, one longitudinal side of which is delimited by the stop surface 18 of the stop web 5. A likewise outwardly arched surface, via which the loose end SE1, which can be guided through the clamping slot 20, of the respective tensioning means S can be guided away in a kink-free manner, is connected to the stop surface 18 in the direction of insertion E. A rounded-off rim 21 is, on the other hand, formed on the stop web 5 before the stop surface 18 in the direction of insertion E. The flat surfaces which meet at this rim 21 are oriented substantially at right angles to one another, so that the tensioning means S is led, before it enters the clamping slot 20, at a defined, fold-free course into the clamping slot 20 via the rim 21.

The fastening portion 6 is embodied in a wedge-shaped manner in cross section, the thinner tip being directed toward the end of the housing 2 that is turned away from the stop web 5. An end SE2 of the tensioning means S that is placed around the fastening portion 6 to form a loop is in this way guided in such a manner that the material loads occurring in the region of this end SE2 are low.

A stop 22, which delimits the pivoting path of a comb element 8 which is pivotably mounted on the pivot spindle 7 in such a way that the clamping slot 20 can be opened only up to a specific maximum pivoting position (FIG. 1), is moulded onto the pivot spindle 7, which is basically circular in cross section, of the housing at an angle of 45° in the direction of the underside U of the housing 2, pointing away from the stop web 5.

The comb element 8, which is made of a high-strength plastics material, has a substantially triangular basic shape. A bearing opening 23 is formed in the side of the comb element 8 that is associated with the spindle shaft 7. The bearing opening is likewise formed so as to be basically circular in cross section, with an inner radius corresponding to the outer radius of the pivot spindle 7, and encloses with its inner surfaces an angle which is greater than 180°. The projection 25 remaining between the bearing opening 23 and the front circumferential surface 24, associated with the stop surface 18 of the stop web 5, of the comb element 8 is, on account of its reduced thickness, sufficiently elastically yielding that the comb element 8 is attached, with slight spreading-open of the bearing opening 23, to the pivot spindle 7 in the manner of a clip connection and is subsequently pivotably mounted there without play.

The circumferential surface 24, associated with the stop surface 18, of the comb element 8 is shaped, in opposition to the stop surface 18, so as to be arched inward. In this case, latching projections 26, which extend parallel to the latching projections 19 of the stop surface 18, are formed in the stop surface 18. The free rims of the latching projections 26 are directed into the clamping slot 20 in the direction of insertion E.

A support portion 28, which is embodied in the manner of a projection, extends over the width B of the clamping slot 20 and protrudes from the circumferential surface 24 in the direction of the stop web 5, is moulded onto the upper edge, associated with the outlet 27 of the clamping slot 20, of the circumferential surface 24. The support portion 28 is in this case shaped and oriented in such a way as to act, when the comb element 8 is pivoted onto the stop web, with its support surface 29 adjoining the circumferential surface 24 against the stop web 5.

A trough-like depression 30 is formed in the upper side of the comb element 8 that is remote from the pivot spindle 7. The free end of a lever element 31, which is embodied in an elongated manner in cross section and extends over the width B of the clamping slot 20, is positioned in this depression 30. With its other end, the lever element 31 is pivotably mounted in the housing 2. For this purpose, laterally protruding lugs 32, 33, which are captively and rotationally movably held in receptacles 34, 35 formed in the cheeks 3, 4, are moulded onto the end in question.

In order to additionally simplify manual holding of the clamping lock 1, grip troughs 36 are formed in the cheeks 3, 5 from the underside U.

For tensioning the tensioning means S which is, for example, in the form of a belt, positioned to form a loop and one end SE2 of which is positioned around the fastening portion 6 in the manner described hereinbefore, the comb element 8 is firstly pivoted by manually pressing on the lever element 31 from the upper side O of the housing 2 until the stop 22 of the pivot spindle 7 is reached.

The free end SE1 of the tensioning means S can now be guided through the clamping slot 20 unimpeded. In this case, the dimensions of the maximum width of the clamping slot 20 are such that a slight contact remains in each case between the latching projections 26 of the circumferential surface 24 of the comb element 8 and the side associated therewith of the tensioning means S.

The loose end SE1 of the tensioning means S is now drawn by hand through the clamping slot 20 until the required tensile stress is built up in the tensioning means S. Subsequently, the tensioning force K acting on the end SE1 is released. This results in a merely very short backward movement of the tensioning means S. However, in the course of this backward movement, the latching projections 26 of the comb element 8 reach in a form-fitting manner into the tensioning means S resting against the circumferential surface 24 of the comb element 8, so that the comb element 8 is pressed against the stop surface 18 of the stop web 5. At the latest at this point do the latching projections 19 of the stop web 5 also reach into the tensioning means S, so that a form-fitting connection between clamping lock 1 and tensioning means S is produced also in the region of the stop surface 18 of the stop web 5.

In the position of the comb element 8 pressing on the tensioning means S resting against the stop web 5, the clamping slot 20 is shaped in such a way that it narrows, viewed in cross section, starting from its inlet in the direction of its outlet 27. The clamping force prevailing in the clamping slot 20 is in this case limited in that the support portion 28 is supported against the stop web 5 via its support surface 29 and between support portion 28 and stop web 5. If excessively high tensile forces act in the tensioning means S, the clamping prevailing in the clamping slot 20 is overcome and the tensioning means S begins to slide out of the clamping slot 20. This reliably prevents overloading of the clamping slot 1.

For purposefully detaching the clamping, the lever element is pressed by slight pressure against the end of the comb element 8 that is associated therewith and protrudes in the manner of a projection, so that the comb element is pivoted back into its opening position and the end SE1 of the tensioning means S can be drawn back freely through the clamping slot 20.

Figure 2:
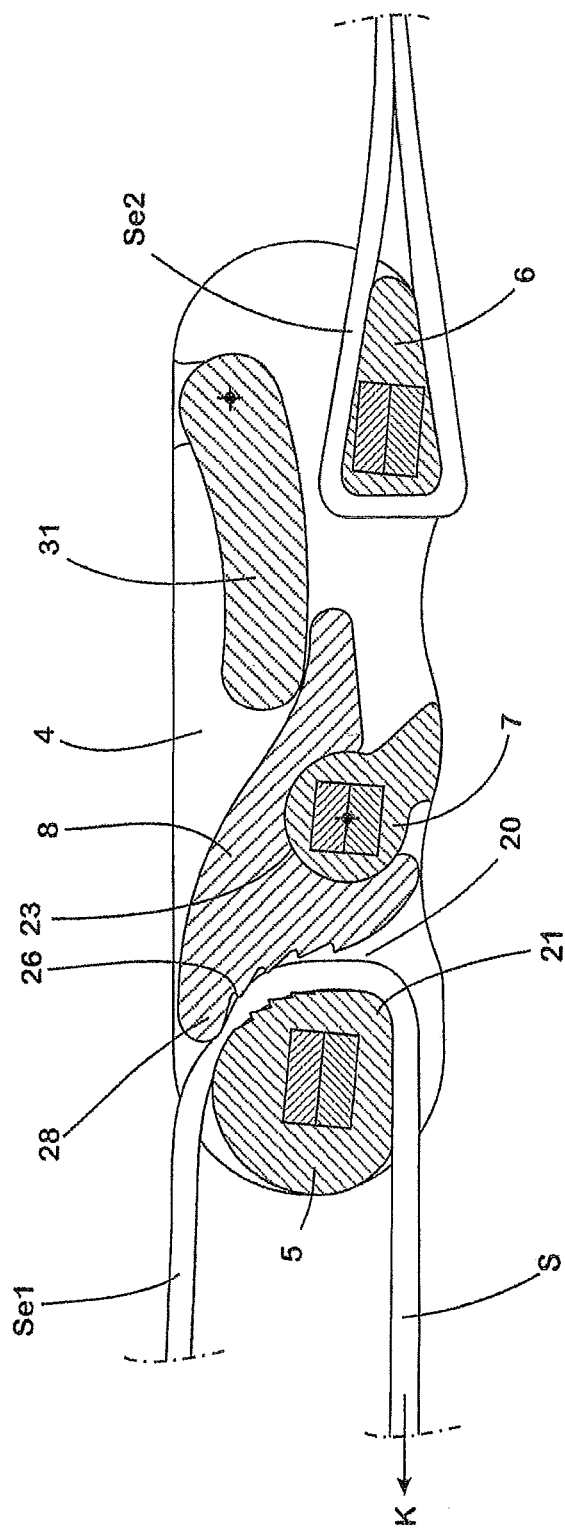
FIG. 2 is a schematic view of the clamping lock shown in FIG. 1, in the clamping position.
Figure 3:
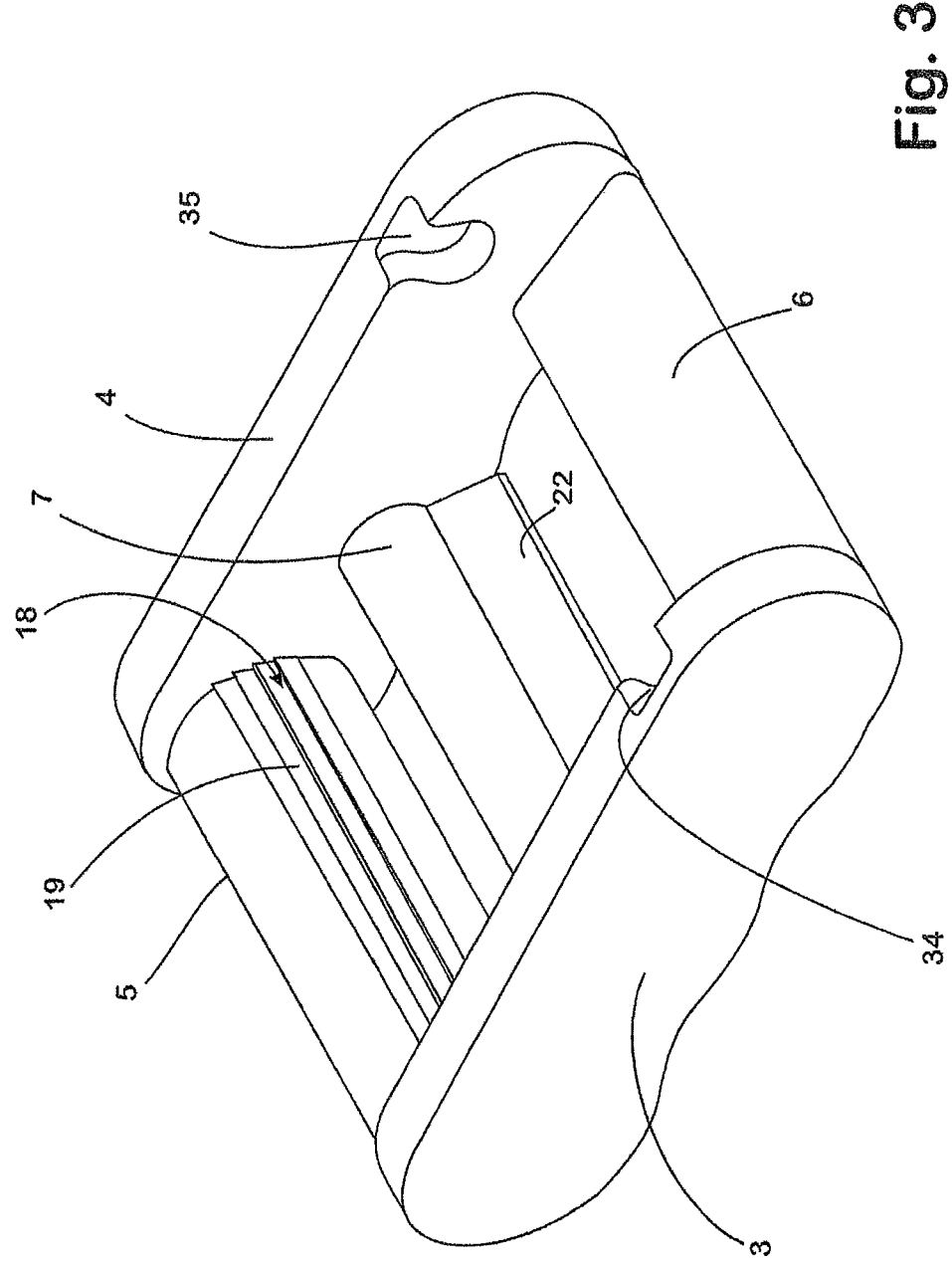
FIG. 3 is a schematic perspective view of the housing of the clamping lock shown in FIGS. 1 and 2.
Figure 4:
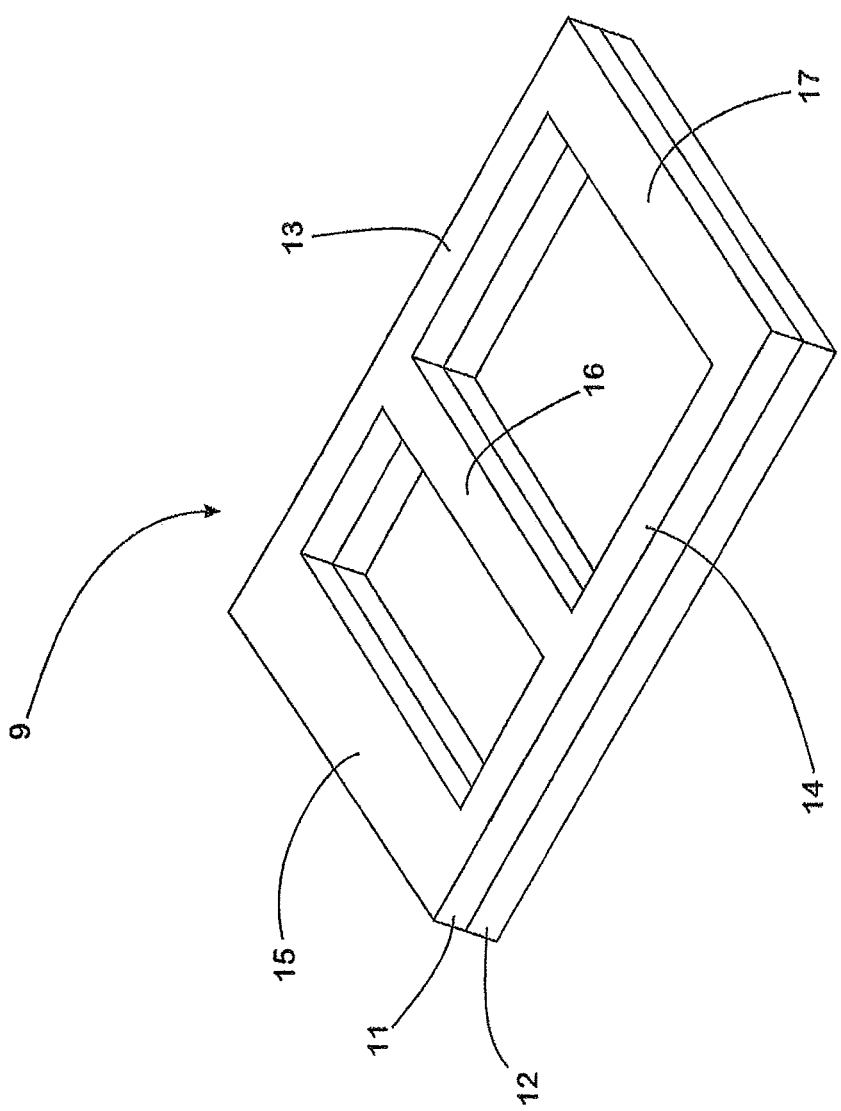
FIG. 4 is a schematic perspective view of a reinforcing insert which is suitable for the housing shown in FIG. 3.
Figure 5A:
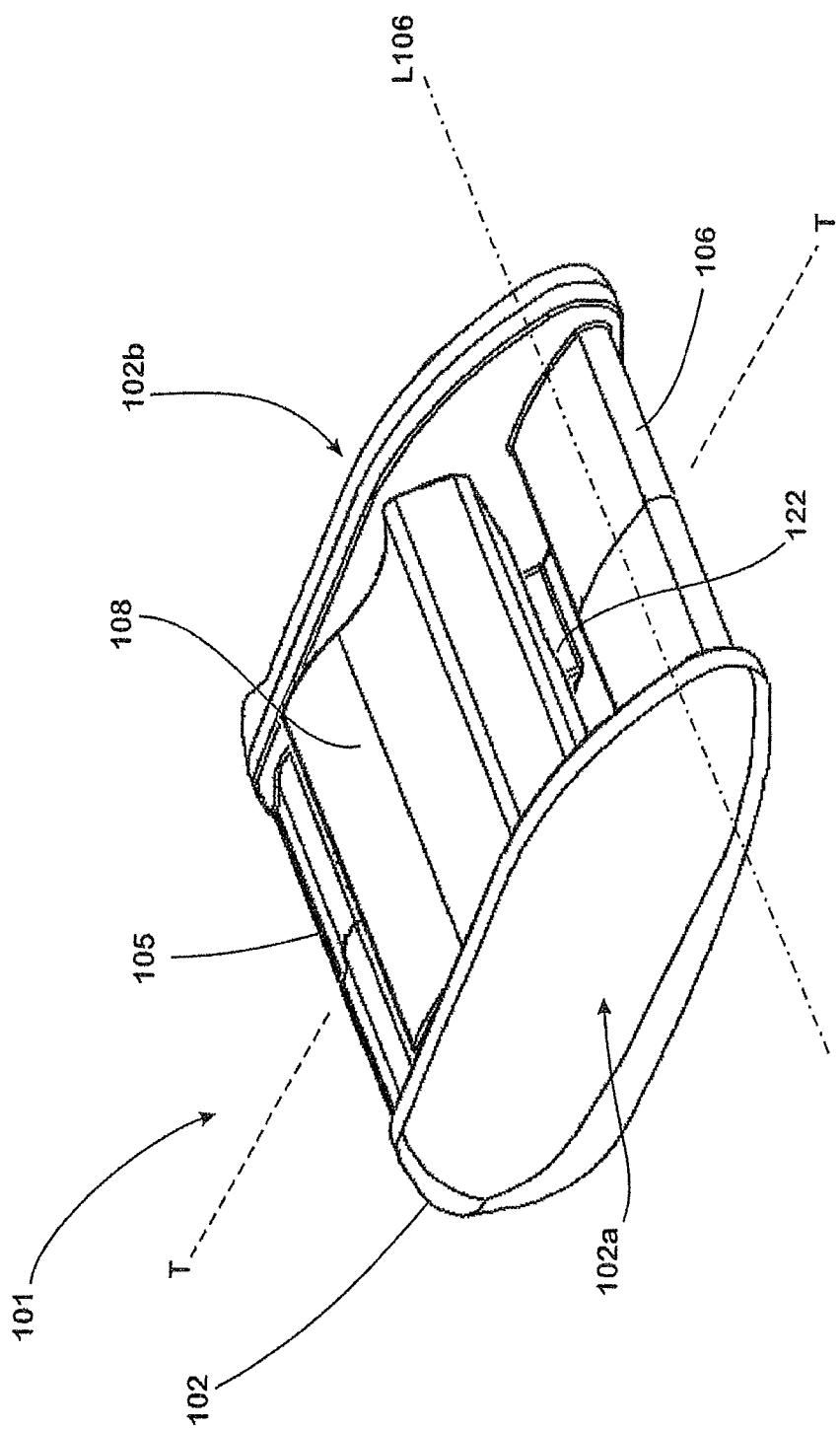
FIG. 5a is a schematic perspective illustration of a second variant of a clamping lock.
Figure 5B:
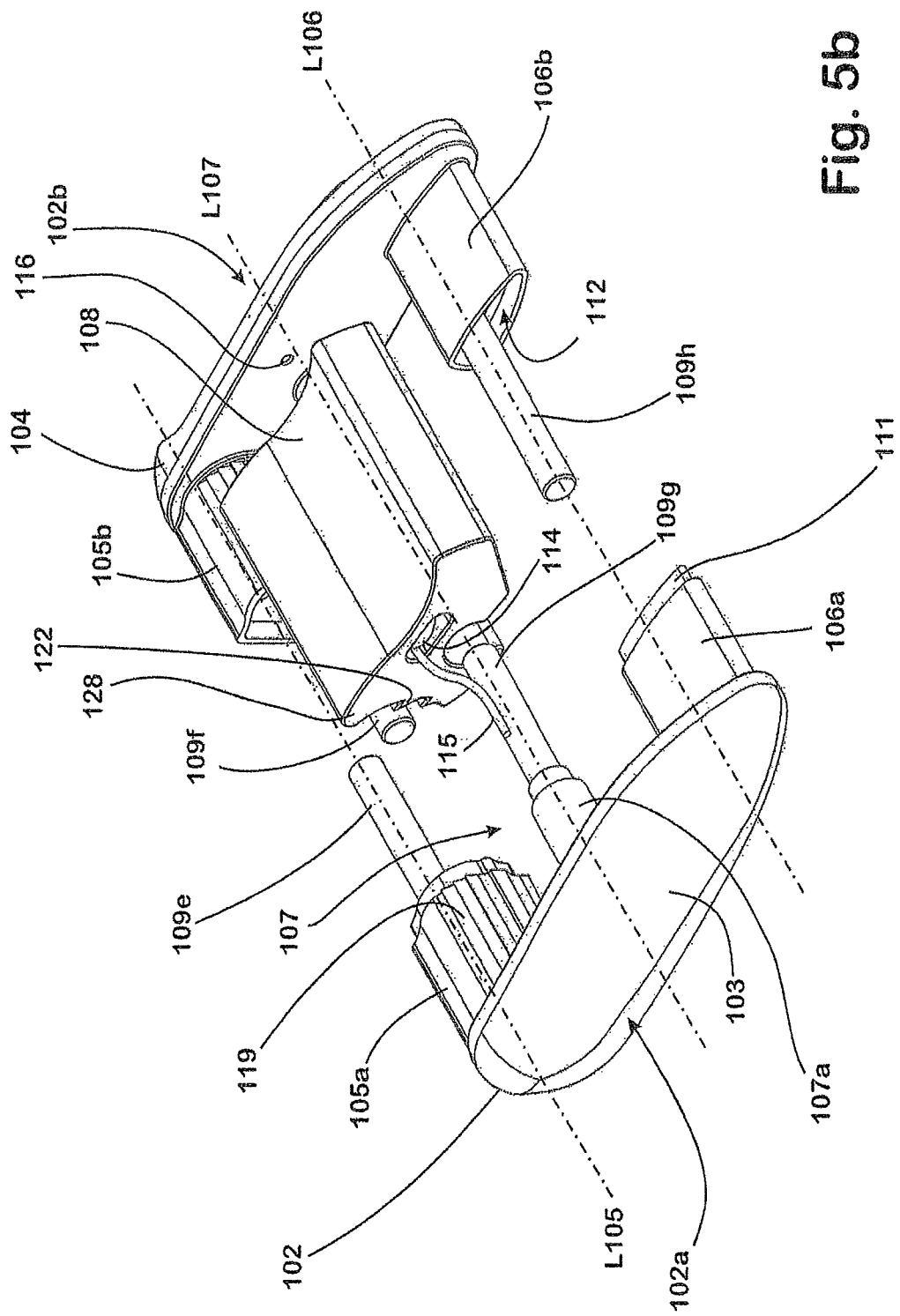
Figure 6:
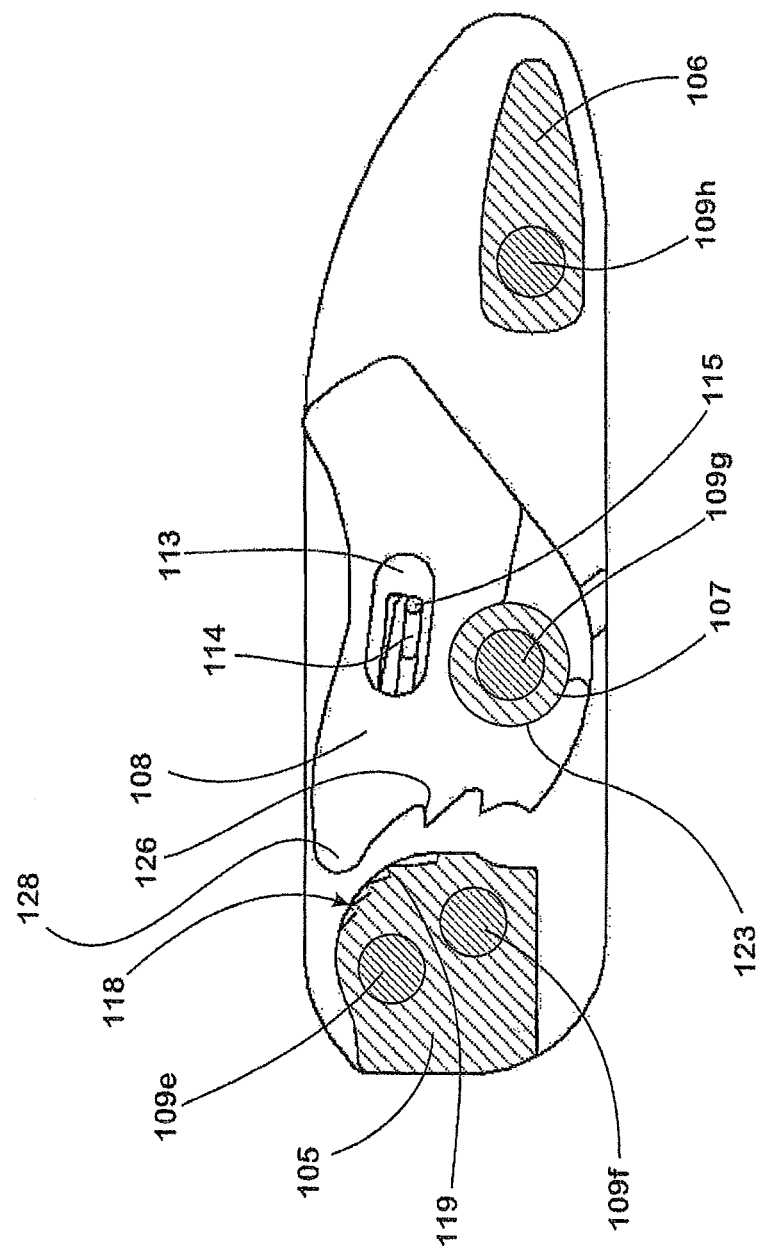
Figure 7:
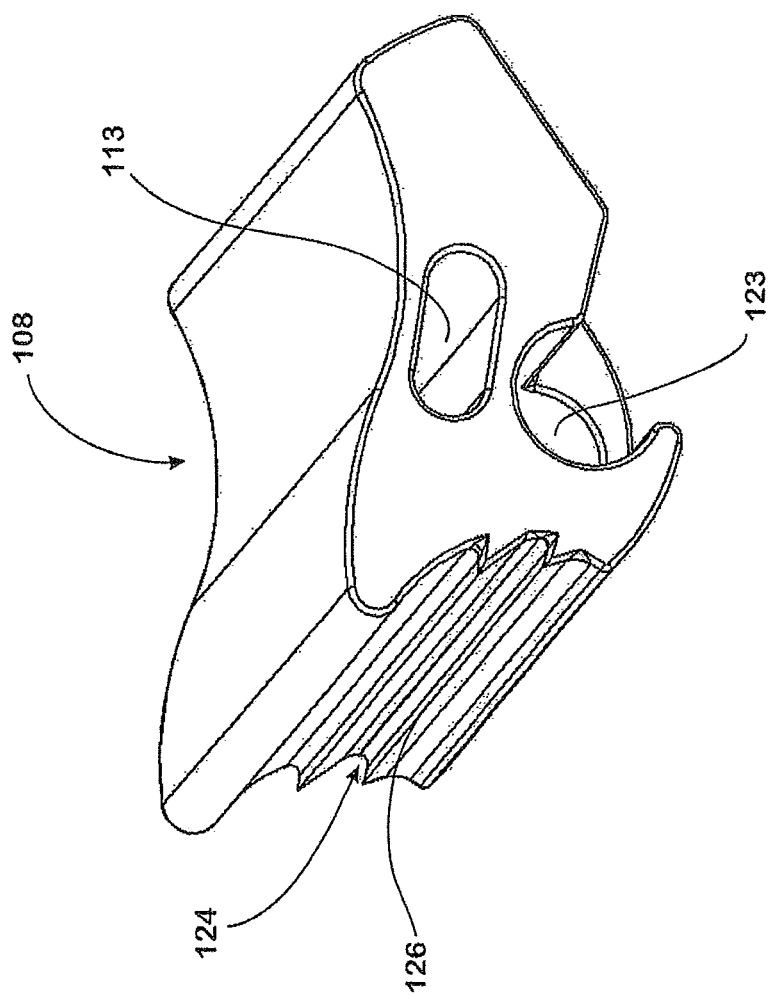
FIG. 7 is a schematic perspective view of a comb element used in the clamping lock shown in FIGS. 5a to 6.

In the clamping lock 101 shown in FIGS. 5a to 6, the housing 102 is composed of two housing parts 102a, 102b. The housing 102 has in this case two opposingly arranged elongate cheek parts 103, 104 between which a stop web 105, a fastening portion 106 and a pivot spindle 107 extend. The positioning and the function of the stop web 105, the fastening portion 106 and the pivot spindle 107 correspond in this case in principle to the positioning and the function of the stop web 5, the fastening portion 6 and the pivot spindle 7 in the housing 1 shown in FIGS. 1 to 3.

The parting plane T of the housing 102 is arranged at the centre between the cheek parts 103, 104 and oriented normally to the longitudinal axes L105, L106, L107 of the stop web 105, the fastening portion 106 and the pivot spindle 107. The parting plane T accordingly intersects the longitudinal axes L105-L107 in question in each case at an angle of 90°.

In accordance with the division defined by the parting plane T of the housing parts 102a, 102b, the stop web 105, the fastening portion 106 and the pivot spindle 107 are each divided into two halves, of which FIG. 5 shows the halves 105a, 105b of the stop web 105 and the halves 106a, 106b of the fastening portion 106 and also the half 107a of the pivot spindle 107 that is associated with the housing part 102a. The halves of the stop web 105, the fastening portion 106 and the pivot spindle 107 are in this case integrally connected to the cheek part 103 or 104 respectively associated therewith.

Figure 8:
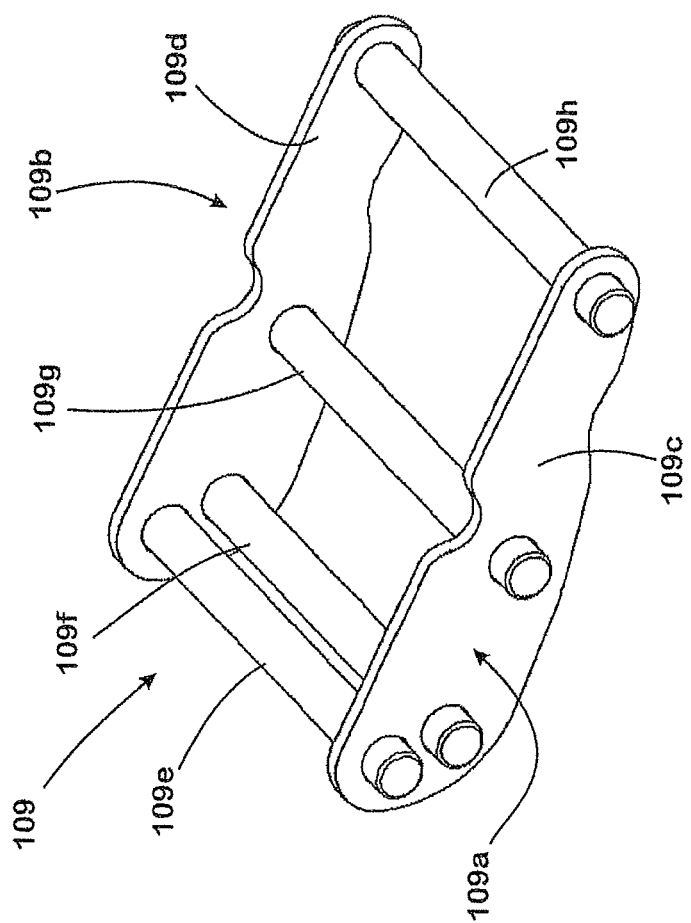
FIG. 8 is a schematic perspective view of a reinforcing insert used in the clamping lock shown in FIGS. 5a to 7.

One half 109a, 109b of the reinforcing insert 109 shown in FIG. 8 is positioned in the housing parts 102a, 102b. The reinforcing insert 109 accordingly has two elongate cheek parts 109c, 109d which are punched out of a metal sheet and arranged parallel to one another like the cheek parts 103, 104 of the housing 102. Bolt-like webs 109e, 109f, 109g, 109h, which consist of metal and arranged axis-parallel to one another and of which the webs 109e and 109f are associated with the stop web 105, the web 109g is associated with the pivot spindle 107 and the web 109h is associated with the fastening portion 106, extend in each case in the portions of the reinforcing insert 109 that are associated with the regions of the stop web 105, the fastening portion 106 and the pivot spindle 107. The webs 109e, 109f associated with the stop web 106 are positioned closely adjacent to one another in order to impart particularly high stability to the stop web 105.

One half 109a of the reinforcing insert 109 is formed by the cheek part 109c, the web 109e of the stop web 105 and the web 109g of the pivot spindle 107. The webs 109e and 109g are in this case securely and non-detachably connected by their ends associated with the cheek part 109c to this cheek part 109c in the manner of rivetings, whereas their ends associated with the cheek part 109d of the other half 109b are free prior to assembly of the housing 102.

In a corresponding manner, the other half 109b of the reinforcing insert 109 is formed by the cheek part 109d, the second web 109f of the stop web 105 and the web 109h of the fastening portion 109h. The webs 109f and 109h are in this case securely and non-detachably connected by their ends associated with the cheek part 109d to this cheek part 109d in the manner of rivetings, whereas their ends associated with the cheek part 109c of the other half 109a are free prior to assembly of the housing 102.

The halves 109a, 109b of the reinforcing insert 109 are each completely sheathed with a plastics material casing 110, the outer shape of which determines the illustrated outer form of the housing parts 102a, 102b. The outer shaping of the plastics material casing 110, which is securely and non-detachably connected to the reinforcing insert 109 as a result of the sheathing, is in this case selected in such a way that not only may the clamping lock 101 be effectively handled in the assembled state, but there is also no risk of injury. The webs 109e and 109g associated with the housing part 102a and the webs 109f and 109h of the reinforcing insert 109 that are associated with the housing part 102b are in this regard surrounded, starting in each case from the respective cheek part 109c, 109d, by the respective plastics material casing 110 only up to about halfway.

At the same time, moulded elements, such as projections 111 and corresponding recesses 112, via which the halves in question may be combined in a form-fitting manner during assembly of the clamping lock 102, are moulded on through the plastics material casing 110 in the region of the mutually associated ends, which are still free in the pre-produced state, of the halves 105a, 105b of the stop web 105, the halves 106a, 106b of the fastening portion 106 and the halves 108a, 107b of the pivot spindle 107. In this case, the projections 111 and recesses 112 can readily be embodied in such a way that the halves of the stop web 105, the fastening portion 106 and the pivot spindle 107 each interlock with one another in a non-detachable manner.

At the same time, an opening which cannot be seen in this drawing and extends axis-parallel to the web 109a, for the web 109f of the reinforcing insert 109, which web protrudes from the housing part 102b, is formed in the halves 105a of the stop web 105. In a corresponding manner, an opening (which cannot be seen here either) for the web 109g of the pivot spindle 107 that likewise protrudes from the housing part 102b is provided in the half 106a of the fastening spindle 106. Likewise, openings, which are not illustrated here either and into which the respectively associated, freely protruding portions of the webs 109e, 109g may be inserted, are formed in the half 105b of the stop web 105 and the non-visible half of the pivot spindle that is associated with the housing part 102b.

In order to permanently secure the connection between the housing parts 102a, 102b, the halves of the stop web 105, the fastening portion 106 and the pivot spindle 107 are additionally connected in a material-uniting manner, by welding or adhesive bonding, in their contact region and in the region of the openings into which the respective free portions of the webs 109e-109h of the reinforcing insert 109 are inserted.

The basic shape of the comb element 108 of the clamping lock 102 corresponds to the comb element 8 of the clamping lock 2 shown in FIG. 1. This concerns, in particular, both the shaping and arrangement of its latching projections 126 and its support portion 128, which is embodied in the manner of a projection, and the shaping and arrangement of its inwardly arched circumferential surface 124 which is provided with the latching projections 126. Likewise, the outwardly arched stop surface 118 and the latches 119 present thereon are embodied like the stop surface 18 and the latches 19.

However, in contrast to the comb element 8, the comb element 108, which consists of plastics material, has a bearing opening 123 which although it is arranged in accordance with the bearing opening 23 in the comb element 8, in its central portion is, however, completely surrounded by the plastics material of the comb element 108.

At its end portions, the bearing opening has recesses which are each open to the underside of the comb element 108 and into which stops 122, which are moulded onto the inner side of the cheek parts 103, 104, reach when the clamping lock 102 is fully assembled. The stops 122 delimit, as previously commented on in relation to the comb element 8 and the stop 22 in the clamping lock 2 shown in FIGS. 1 to 3, the adjustment path of the comb element 108.

In addition, a receiving pocket 113, which extends offset from the upper side of the comb element 108 and parallel to the bearing opening 123, is formed in the comb element 108. The receiving pocket 113 contains a spring element 114 which is shaped from wire and reaches, when the clamping lock 102 is assembled, with its free ends 115 in each case into an opening 116 formed in the inner sides of the cheek parts 103, 104 and exerts in the manner of a torsion spring on the comb element 108 a resilient restoring force which automatically pivots the comb element 108 against the stop surface 118 of the stop web 105.

The invention claimed is:

1. A clamping lock for a tensioning means, the clamping lock having a housing comprising two cheek parts arranged at a distance from each other, a stop web with a stop surface which extends between the cheek parts, a pivot spindle which extends between the cheek parts, a comb element pivotably mounted on the pivot spindle, the comb element having a circumferential surface portion associated with the stop surface of the stop web to delimit a clamping slot with the stop surface of the stop web for feeding through the tensioning means such that a tensile force draws the comb element into the clamping slot, and a reinforcing insert at least in the region of the cheek parts, of the stop web, and of the pivot spindle, said reinforcing insert being surrounded by a plastics material casing that defines an outer shape of the housing and being made of a material which is firmer than the material of the plastics material casing,
wherein a support portion is formed on a boundary of the circumferential surface portion of the comb element,
wherein the boundary is associated with an outlet of the clamping slot, and
wherein the support portion supports the comb element against the stop web when the comb element is pivoted against the stop web.

2. The clamping lock according to claim 1, wherein the housing has a fastening portion.

3. The clamping lock according to claim 2, wherein the fastening portion is embodied in a web-like manner and is embodied so as to extend parallel to the stop web.

4. The clamping lock according to claim 2, wherein a portion of the reinforcing insert reinforces the fastening portion.

5. The clamping lock according to claim 1, wherein the stop web and the pivot spindle of the comb element of the housing are shaped in one piece.

6. The clamping lock according to claim 1, further comprising a bearing opening, which has, viewed in cross section, an inner circumferential surface which encompasses an angle of more than 180° and is arched inward in the shape of an arc of a circle, formed into the comb element.

7. The clamping lock according to claim 1, wherein the housing is composed of two housing parts and a parting plane of the housing intersects the longitudinal axis of stop web and pivot spindle, in each case at an angle which is greater than 0°.

8. The clamping lock according to claim 7, wherein the parting plane of the housing runs in the centre of the space delimited laterally by the cheek parts.

9. The clamping lock according to claim 7, wherein the parting plane is oriented normally to the longitudinal axis of the pivot spindle, of the stop web and of the fastening portion.

10. The clamping lock according to claim 7, wherein the housing parts are non-detachably connected to each other.

11. The clamping lock according to claim 10, wherein the housing parts are connected to each other in a material-uniting manner.

12. The clamping lock according to claim 7, wherein the housing parts are connected to each other in a form-fitting and/or force-transmitting manner.

13. The clamping lock according to claim 1, wherein the plastics material casing is sprayed onto the reinforcing insert.

14. The clamping lock according to claim 1, wherein the reinforcing insert consists of metal.

15. The clamping lock according to claim 1, further comprising a receptacle, containing a spring which resiliently elastically supports the comb element against at least one of the cheek parts in such a way that the spring automatically pivots the comb element in the direction of the stop web, formed in the comb element.

16. The clamping lock according to claim 1, further comprising a stop, which limits the pivoting path of the comb element on the pivot spindle, embodied on the pivot spindle.

17. The clamping lock according to claim 1, further comprising a lever element mounted in an independently pivotably movable manner and pivots the comb element, on exertion of an actuating force directed onto the lever element, from a clamping position, in which it acts against the stop web, into a release position pivoted away from the stop web.

* * * * *